United States Patent
Man et al.

(10) Patent No.: US 8,701,195 B2
(45) Date of Patent: Apr. 15, 2014

(54) METHOD FOR ANTIVIRUS IN A MOBILE DEVICE BY USING A MOBILE STORAGE AND A SYSTEM THEREOF

(75) Inventors: Zhiyong Man, Beijing (CN); Yu Lin, Beijing (CN); Shihong Zou, Beijing (CN)

(73) Assignee: Netqin Mobile (Beijing) Co., Ltd, Beijing (CN)

( * ) Notice: Subject to any disclaimer, the term of this patent is extended or adjusted under 35 U.S.C. 154(b) by 8 days.

(21) Appl. No.: 13/479,512

(22) Filed: May 24, 2012

(65) Prior Publication Data
US 2012/0304298 A1    Nov. 29, 2012

(30) Foreign Application Priority Data

May 27, 2011    (CN) .......................... 2011 1 0141353

(51) Int. Cl.
*G06F 21/00*    (2013.01)
(52) U.S. Cl.
USPC .......................................................... 726/24

(58) Field of Classification Search
USPC .................................................. 726/22, 24, 23
See application file for complete search history.

(56) References Cited

U.S. PATENT DOCUMENTS

| | | | |
|---|---|---|---|
| 7,216,367 B2 * | 5/2007 | Szor ................................. | 726/25 |
| 2006/0075216 A1 * | 4/2006 | Vaha-Sipila et al. .............. | 713/2 |
| 2008/0282350 A1 * | 11/2008 | Khilnani et al. .................. | 726/24 |
| 2010/0241875 A1 * | 9/2010 | Ishii et al. ........................ | 713/193 |

* cited by examiner

*Primary Examiner* — Edward Zee
(74) *Attorney, Agent, or Firm* — Baker & McKenzie LLP

(57) ABSTRACT

A method for antivirus in a mobile device is performed by using a mobile storage and a system thereof. The method includes a mobile storage that is connected to a mobile device. The control module in the mobile storage automatically runs. The control module obtains root privilege of the operation system of the mobile device, and calls virus-killing module in the mobile storage to eliminate a file(s) or program(s) threatening security of the mobile device. The advantage is to obtain the newest antivirus method by using a mobile storage when a mobile device is unable to update antivirus software through internet.

8 Claims, 3 Drawing Sheets

METHOD FOR ANTIVIRUS IN A MOBILE DEVICE BY USING A MOBILE STORAGE AND A SYSTEM THEREOF

FIELD OF THE INVENTION

The invention relates to communication security field and in particular, to a method for antivirus in a mobile device by using a mobile storage and a system thereof.

BACKGROUND OF THE INVENTION

With popularity of smart phone and other intelligent mobile devices, virus in a mobile phone increases tremendously, for example virus such as Trojan and Worm in a mobile phone, targets at smart phone or mobile device. The virus in a mobile phone can invade a mobile device in many forms, such as short message, multi-media message, wireless network download, WiFi or bluetooth connection. Therefore positive security protection is very important for a mobile device.

Malicious software in a mobile phone can cause many serious problems. For example virus in a mobile phone can consume power of a mobile phone quickly, delete important commercial information of a user, and even disable a specific function of a mobile phone. Besides for prohibition of normal function of a mobile phone, virus such as sniffing virus in a mobile phone can obtain privilege of control in a mobile phone and change the mobile phone into a mobile sniffer, and even open a webcam to take pictures and send the pictures to the network.

Currently, for virus in a mobile phone, virus-killing software on client side of a mobile device is used and virus database update is downloaded for guarding against it. Specifically, virus database stores features of all virus files, virus-killing software makes use of the features to check program and files in the mobile device and in case of finding a file with same feature to the feature in the virus file, identifies the file as a virus file, isolates and deletes it. For the new emerging virus program or files, it needs to obtain feature of the virus and add the feature to the virus database.

Although the aforesaid process can identify known viruses or varieties thereof, there still exists a risk in those unknown viruses. For example, virus can explore quickly and cause damage on a wide scope and virus-killing software developer may not get the time to update virus database of a user while the user's mobile phone has been infected by a new virus. Moreover, method for controlling a mobile device by a virus is continuously emerging, such as delete files in a mobile device to disable the virus-killing software or hog network traffic flow of a mobile device to disable the mobile device to download update for the virus database. All above problems can disable the known virus-killing processes.

For the above reasons, a solution is required for clearing a virus or enabling virus-killing software to run normally in emergency of out-of-work of the current virus-killing processes.

SUMMARY OF THE INVENTION

The objective of the invention is providing a solution capable of antivirus in the mobile device by using a mobile storage to therefore provide targeted virus-killing service when the mobile device is unable to forwardly conduct antivirus.

According to one aspect of the invention, the technical solution is providing a method for antivirus in a mobile device by using a mobile storage, which comprises the following steps: the mobile storage is connected to the mobile device, control module in the mobile storage automatically runs, and obtains root privilege of an operation system of the mobile device and calls a virus-killing module in the mobile storage, as well as the virus-killing module eliminates a file(s) or program(s) threatening security of the mobile device.

According to one aspect of the invention, the control module in the mobile storage automatically running comprises that an installation package of the control module in the mobile storage is automatically copied and installed into the mobile device, and then the control module automatically runs.

According to one aspect of the invention, the control module in the mobile storage automatically running comprises that the mobile device automatically reads and runs a control module program in the mobile storage.

According to one aspect of the invention, the mobile device is made to enter into safe mode by the control module, which comprises all applications in the mobile device are terminated except for the control module.

According to one aspect of the invention, a suspicious process(es) disguised as operation system is terminated in order to close the process(es) normally and not impact normal running of the mobile device.

According to one aspect of the invention, the control module obtaining root privilege of the operation system of the mobile device comprises that a suspicious process(es) is prevented from intervention on operation of the control module.

According to one aspect of the invention, the virus-killing module reads one of data files of virus definition database stored in the mobile storage and identifies an unofficially released and maliciously tampered definition database(es) according to the related virus definition.

According to one aspect of the invention, the technical solution is to provide a system of antivirus in a mobile device by using a mobile storage, comprising a mobile storage including a control module and a virus-killing module, the mobile storage being used to store data which can be read by the mobile device, and the control module being used to communicate with the mobile device; once the mobile storage and the mobile device are connected, the mobile device automatically running the control module and the control module obtaining root privilege of an operation system of the mobile device; the virus-killing module being used to communicate with the control module, the virus-killing module being called by the control module and eliminating a program(s) or file(s) threatening security of the mobile device when running.

Advantage of the invention is to start a virus-killing process by using an external storage when the mobile device is unable to forwardly conduct antivirus and further to execute specific virus-killing by an external storage when the mobile device is unable to download or install update for antivirus software.

BRIEF DESCRIPTION OF THE DRAWINGS

The invention will be set forth in accompany with below flow charts.

DETAILED DESCRIPTION OF THE INVENTION

The invention provides a method for antivirus in a mobile device by using a mobile storage. With the virus-killing mechanism provided by the mobile storage, a targeted virus-killing service is supplied when the mobile device is unable to forwardly conduct antivirus.

Figure 1:
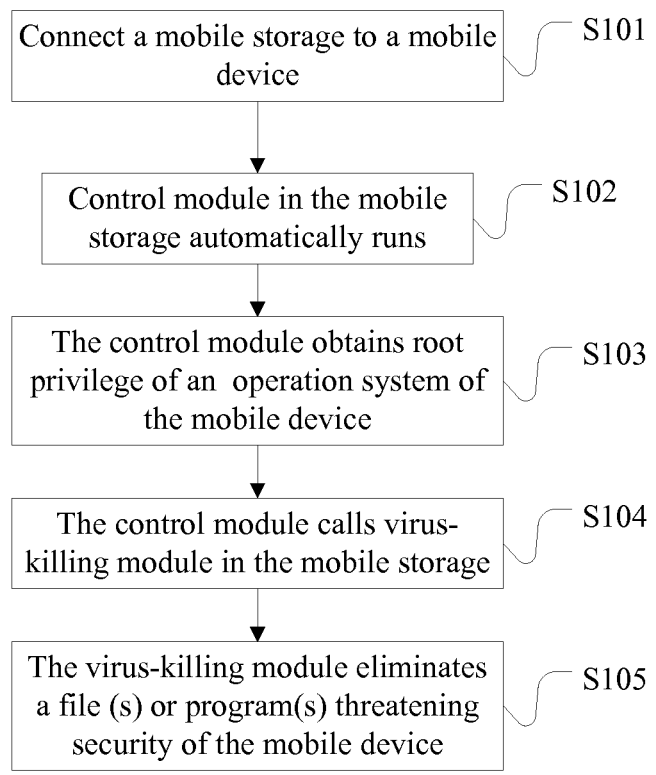
FIG. 1 is a flow chart of method for antivirus in a mobile device by using a mobile storage according to the invention.

According to one embodiment of the invention, the method for antivirus in a mobile device uses an external storage of the mobile device. As shown in FIG. 1, in step S101, the mobile storage is connected to the mobile device. In step S102, control module in the mobile storage automatically runs. In step S103, the control module obtains root privilege of an operation system of the mobile device. In step S104, the control module calls a virus-killing module in the mobile storage. In step S105, the virus-killing module eliminates a file(s) or program(s) threatening security of the mobile device.

Figure 2:
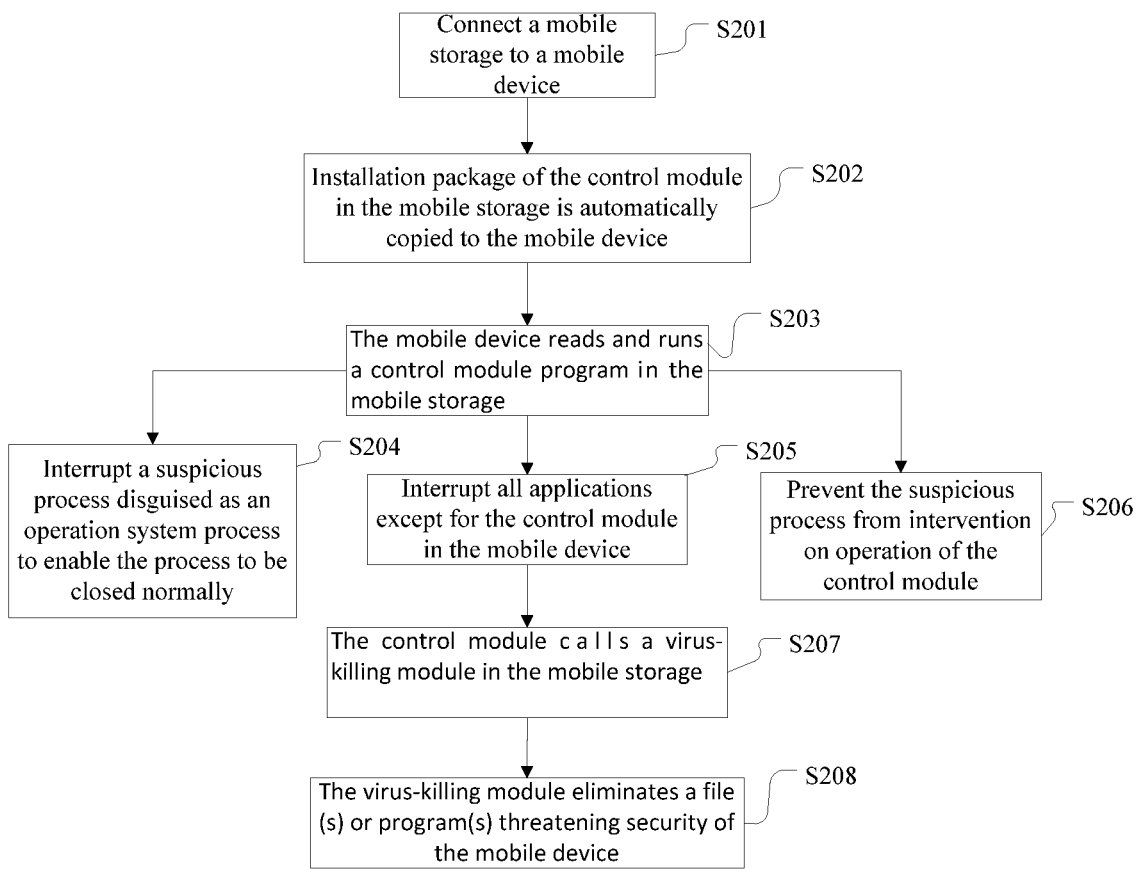
FIG. 2 is an operational flow chart of antivirus in a mobile device by using a mobile storage according to the invention.

According to one embodiment of the invention, the operation flow chart of antivirus in a mobile device by using a mobile storage device is illustrated in FIG. 2. According to the embodiment, the mobile device is a mobile phone and an operation system of the mobile device is a Sybian operation system. Those skilled in the art should appreciate that the method of the invention is applied not only for a mobile phone with Sybian operation system, but also for other mobile devices, such as electronic books or tablet computers, and for other operation systems, such as Android or IOS operation system.

In step S201, the mobile storage is connected to the mobile device. Optionally, the mobile storage can be a TransFlash card, SD (Security Digital) card, MMC (Multi-Media Card) or Mini MMC. Those skilled in the art should appreciate that other storage cards applicable to a mobile device can be also applied for the method of the invention in order to realize purpose of the invention.

In step S202, an installation package of the control module in the mobile storage is automatically copied to the mobile device. According to the embodiment, type of the installation package file (.pkg file) is set to be SA and the signed sis or sisx installation program is stored in the path e:\private\10202dce. So far, when the TF card is inserted into the mobile phone, the mobile phone automatically scans applications in the card, and the package will be installed automatically if available.

In step S203, the mobile device automatically reads and runs a control module program in the mobile storage. According to the embodiment, the program attribute in the .pkg file is set to be in auto-run mode, for example FILERUN=FI, and thus the program will automatically run after being installed.

According to one embodiment of the invention, in step S202, type of the installation package file (.pkg file) is set to be PA, and path of resource file in the .pkg file is set to be path of the current mobile storage, for example "e:" The resource file necessary for installation is stored in a corresponding directory in the mobile storage, specifically, the signed sis or sisx installation program is stored in the path e:\private\10202dce. In step S203, the mobile device automatically reads the control module program in the mobile storage and prompts a user to confirm on starting a corresponding program. For example, prompt the user to click on a program icon in the mobile phone menu to start the related program.

In step S204, the control module terminates all applications in the mobile device except for the control module. Specifically, the step is to span boundary between user mode and kernel mode with LDD (Logical Device Driver) to make the control module run in kernel mode and to take charge of all operations in the system, such as killing any thread or process and etc.

In step S205, a suspicious process disguised as an operation system process is terminated to make the process closed normally. Because virus program can set itself to be a kernel process by a function of User:: SetCritical( ), and thus it cannot be terminated by a normal method. If a process not in both C disk and E disk is found running, the first step is to check Critical attribute of the process, if the Critical attribute is System, the process should be terminated in kernel mode with LDD technology.

In step S206, a suspicious process is prevented from intervention on operation of the control module. After step S205, all common third party processes should be terminated. However by some technologies, some codes can be injected into a process in a system file server or a drawing server process to prevent the method of the invention from taking effect, and in this case it can be inspected and prohibited by checking components in C disk or E disk loaded by the system. For example, iphook technology on symbian platform can inject codes into a networking server process for running, and correspondingly, the codes need to be deleted from the disk or removed in order to invalidate it.

In step S207, the control module calls a virus-killing module in the mobile storage.

In step S208, the virus-killing module eliminates a file(s) or program(s) threatening security of the mobile device. Optionally, the virus-killing module eliminates a virus file in a specific location according to related setting, or scans files in the mobile device by using predefined virus features.

Optionally in step S208, the virus-killing module reads one of data files of virus definition database stored in the mobile storage and identifies an unofficially released and maliciously tampered definition database.

Figure 3:
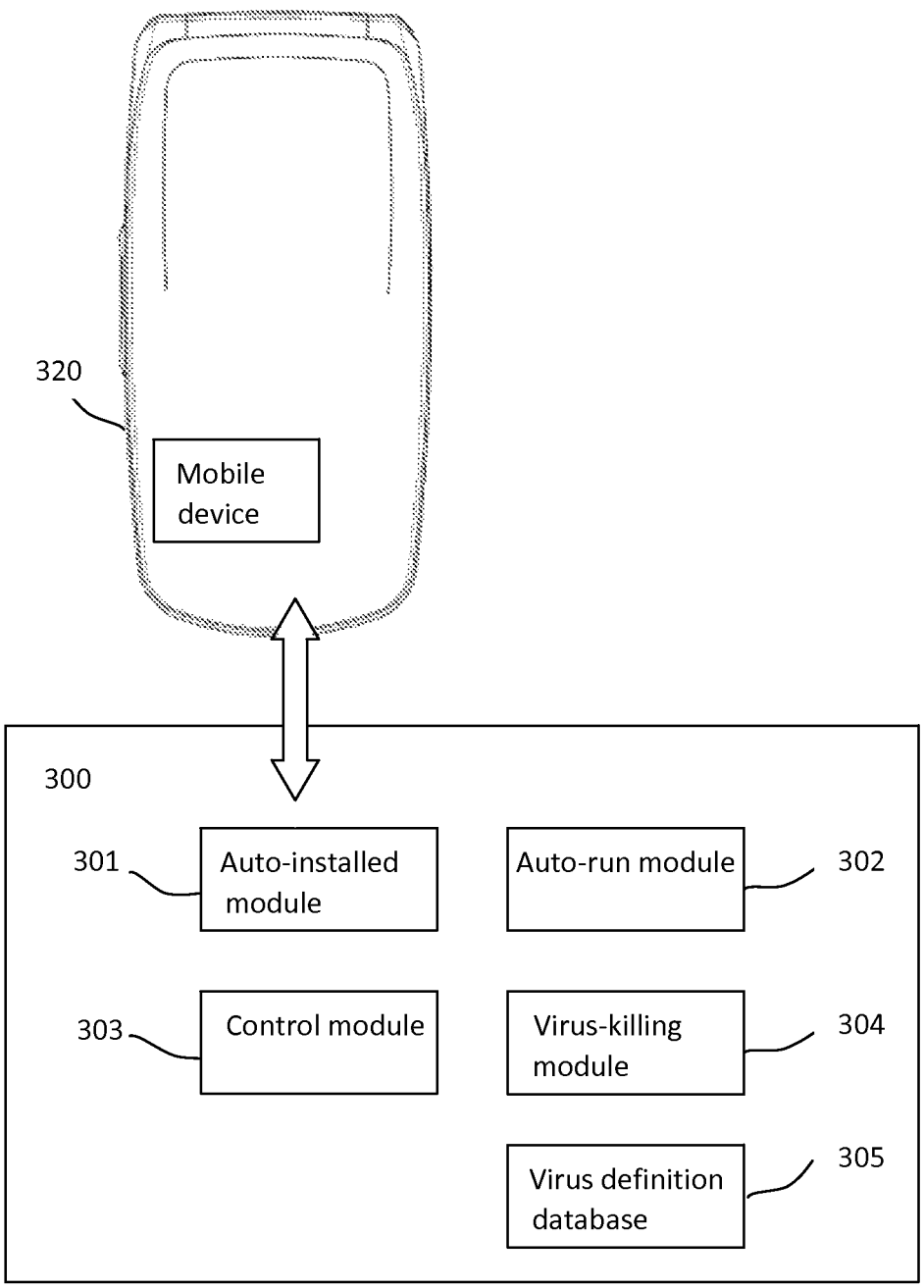
FIG. 3 is a flow chart of running process of the invention.

According to one embodiment of the invention, the mobile storage system capable of antivirus in the mobile device is illustrated in FIG. 3. The mobile storage system 300 capable of antivirus in the mobile device includes a mobile storage 310, an auto-installed module 301, an auto-run module 302, a mobile device control module 303, a virus-killing module 304 and a virus definition database 305.

The auto-installed module 301 is deployed in the mobile storage 310, and is able to communicate with the mobile device 320. When the mobile storage 310 is connected to the mobile device 320, for example a TF card is inserted into a mobile phone, the auto-installed module 301 is activated and installs related program in the mobile device 320. Optionally, the related program is installed in the mobile device or in a specific directory in the mobile storage.

The auto-run module 302 is deployed in the mobile storage 310. After the auto-installed module 301 completes installation of the program, the auto-run module 302 enables the installed program module to automatically run.

The control module 302 communicates with operation system kernel in the mobile device. According to the embodiment, the control module 303 terminates all applications except for the control module in the mobile device as well as suspicious process disguised as an operation system process and prevents the suspicious process from intervention on operation of the control module.

The virus-killing module 304 communicates with the mobile device 320 and the virus definition database 305. The virus-killing module 304 reads virus definition file stored in the virus definition database 305, scans files in the mobile device 320 according to the virus definition file, and eliminates virus after finding them.

For setting forth purpose of the invention, it is impossible to enumerate each combination of the systems or methods, but a person in the art should appreciate that there exists more combinations and modifications of the invention. So the invention is intended to include all modifications, substitution and changes, for example the control module and the virus-killing module can be pre-deployed in the mobile storage in already-installed mode, and therefore when the mobile storage is connected to the mobile device, the control module and the virus-killing module is automatically activated and run without installation. Besides this, although a specific feature of the invention can be disclosed according to one of the above embodiments, it can also be combined with other features of other embodiments.

We claim:

1. A method for antivirus in a mobile device by using a mobile storage, characterized by comprising
   a) the mobile storage is connected to the mobile device;
   b) a control module in the mobile storage runs automatically;
   c) the control module obtains root privilege of an operation system of the mobile device;
   d) the control module calls a virus-killing module in the mobile storage;
   e) the virus-killing module eliminates a file(s) or program(s) threatening security of the mobile device; and
   f) the mobile device is made to enter into safe mode by the control module, wherein safe mode comprises applications in the mobile device being terminated except for the control module, and wherein the mobile device being made to enter into safe mode further comprises that one or more suspicious processes disguised as the operation system is terminated to close the one or more suspicious processes normally and not impact normal running of the mobile device.

2. The method of claim 1, the step b of the control module in the mobile storage running automatically comprises that an installation package of the control module in the mobile storage is automatically copied and installed into the mobile device and then the control module automatically runs.

3. The method of claim 2, the step b of the control module in the mobile storage running automatically comprises that the mobile device automatically reads and runs the control module program in the mobile storage.

4. The method of claim 3, wherein the control module obtaining root privilege of the operation system of the mobile device comprises that a suspicious process(es) is prevented from intervention on operation of the control module.

5. The method of claim 1, further comprising that the virus-killing module reads one of data files of virus definition database stored in the mobile storage and identifies an unofficially released and maliciously tampered definition database according to the related virus definition.

6. A system of antivirus in a mobile device comprising a mobile storage including a control module and a virus-killing module; the mobile storage being used to store data which can be read by the mobile device; the control module being used to communicate with the mobile device; the mobile device automatically running the control module and the control module obtaining root privilege of an operation system of the mobile device, once the mobile storage and the mobile device are connected;
   the virus-killing module being used to communicate with the control module, the virus-killing module being called by the control module and eliminating a program(s) or file(s) threatening security of the mobile device when running; and
   the mobile device being made to enter into safe mode by the control module, wherein safe mode comprises applications in the mobile device being terminated except for the control module,
   and wherein the mobile device being made to enter into safe mode further comprises that one or more suspicious processes disguised as the operation system is terminated to close the one or more suspicious processes normally and not impact normal running of the mobile device.

7. A system of claim 6, wherein an installation package of the control module automatically runs.

8. A system of claim 6, further comprises a data file(s) of virus definition database, the virus-killing module reading a virus definition database(es) in the mobile storage and identifying an unofficially released and maliciously tampered definition database to prevent the mobile device from damage.

* * * * *